(12) United States Patent
Demirors et al.

(10) Patent No.: US 8,987,382 B2
(45) Date of Patent: *Mar. 24, 2015

(54) HIGH MELT STRENGTH POLYETHYLENE COMPOSITIONS AND METHODS FOR MAKING THE SAME

(75) Inventors: Mehmet Demirors, Pearland, TX (US); Teresa Karjala, Lake Jackson, TX (US); Nicolas Mazzola, Jundiai (BR)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/515,841

(22) PCT Filed: Jan. 11, 2011

(86) PCT No.: PCT/US2011/020853
§ 371 (c)(1),
(2), (4) Date: Jul. 30, 2012

(87) PCT Pub. No.: WO2011/085379
PCT Pub. Date: Jul. 14, 2011

(65) Prior Publication Data
US 2012/0283390 A1  Nov. 8, 2012

Related U.S. Application Data

(63) Continuation of application No. 12/685,148, filed on Jan. 11, 2010.

(51) Int. Cl.
| | | |
|---|---|---|
| *C08F 8/00* | (2006.01) | |
| *C08L 23/10* | (2006.01) | |
| *C08L 23/08* | (2006.01) | |
| *C08J 5/18* | (2006.01) | |
| *C08F 110/02* | (2006.01) | |
| *C08K 5/3435* | (2006.01) | |

(52) U.S. Cl.
CPC .............. *C08L 23/0815* (2013.01); *C08J 5/18* (2013.01); *C08F 110/02* (2013.01); *C08J 2323/36* (2013.01); *C08K 5/3435* (2013.01)
USPC ......................................... 525/194; 525/240

(58) Field of Classification Search
USPC ................................. 525/194, 240
See application file for complete search history.

(56) References Cited

U.S. PATENT DOCUMENTS

| | | | | |
|---|---|---|---|---|
| 4,339,507 | A * | 7/1982 | Kurtz et al. | .................... 428/522 |
| 4,390,666 | A | 6/1983 | Moriguchi et al. | |
| 4,409,367 | A | 10/1983 | Beijleveld et al. | |
| 4,603,173 | A | 7/1986 | Mack et al. | |
| 5,486,575 | A | 1/1996 | Shroff | |
| 5,685,128 | A | 11/1997 | Chum et al. | |
| 6,521,338 | B1 | 2/2003 | Maka | |
| 6,706,822 | B2 | 3/2004 | Guenther et al. | |
| 6,765,048 | B2 * | 7/2004 | Dohrer et al. | .................. 524/425 |
| 6,984,698 | B2 | 1/2006 | McLeod et al. | |
| 7,579,411 | B2 | 8/2009 | Roth et al. | |
| 8,039,554 | B2 * | 10/2011 | Iseki et al. | ...................... 525/240 |
| 2003/0216494 | A1 | 11/2003 | Roth et al. | |
| 2003/0236328 | A1 | 12/2003 | McLeod et al. | |
| 2005/0197433 | A1 | 9/2005 | Roth et al. | |
| 2008/0146740 | A1 | 6/2008 | Roth et al. | |
| 2008/0199673 | A1 | 8/2008 | Allgeuer et al. | |
| 2009/0209158 | A1 | 8/2009 | Richeson et al. | |
| 2010/0210800 | A1 | 8/2010 | Roth et al. | |
| 2011/0003940 | A1 | 1/2011 | Karjala et al. | |
| 2011/0171407 | A1 * | 7/2011 | Mazzola et al. | .............. 428/36.9 |
| 2012/0283390 | A1 | 11/2012 | Demirors et al. | |
| 2013/0035444 | A1 | 2/2013 | Karjala et al. | |

FOREIGN PATENT DOCUMENTS

| | | |
|---|---|---|
| JP | 58-194904 | 11/1983 |
| WO | 02/092653 A1 | 11/2002 |

OTHER PUBLICATIONS

Scaffaro R, et al, On the Effectiveness of Different Additives and Concentrations on the Re-Building of the Molecular Structure of Degraded Polyethylene, Polymer Degradation and Stability, Dec. 2006 vol. 91, No. 12, 1 XP025095966.
Scaffaro R, et al, Effect of the Additive Level and of the Processing Temperature on the Re-Building of Post-Consumer Pipes from Polyethylene Blends, European Polymer Journal, pp. 2947-2955, 2007, XP002633405.
PCT/ US2011/020853, International Preliminary Report on Patentability.
PCT/ US2011/020853, International Search Report.
PCT/ US2011/020853, Written Opinion of the International Searching Authority.
Reach En CLP Stoffenchecker, "Octadecanoic acid, [9-(acetyloxy)-3,8,10-triethyl-1-7,8,10-trimethyl-1,5-dioxa-9-azaspiro [5.5]undec-3-yl]methyl ester", Internet Citation, Dec. 16, 2009 XP-002633360.
La Mantia et al., "Processability and Properties of Re-Graded, Photo-Oxidized Post-Consumer Greenhouse Films", Macromolecular Materials and Engineering, vol. 290, Issue 10, pp. 970-975, Oct. 20, 2005.
La Mantia et al., "Re-Gradation of Photo-Oxidized Post-Consumer Greenhouse Films", Macromolecular Rapid Communications, vol. 26, Issue 5, pp. 361-364, Mar. 4, 2005.
Written Opinion for PCT/US2011/020846, Mail Date Mar. 5, 2011, 7 pages.

(Continued)

*Primary Examiner* — Nathan M Nutter

(57) ABSTRACT

The present invention is a method for increasing the melt strength of a polyethylene resin comprising reacting the polyethylene resin with a free radical generator with a decomposition energy in between −50 kJoule/mole and −250 kJoules/mole and a peak decomposition temperature of less than 280 degree C. The resulting resin has increased melt strength with higher ratio of elongational viscosities at 0.1 to 100 rad/s when compared to substantially similar polyethylene resins which have not been reacted with a free radical generator such as an alkoxy amine derivative.

16 Claims, No Drawings

(56) References Cited

OTHER PUBLICATIONS

Written Opinion for PCT/US2011/020839, Mail Date Mar. 5, 2011, 7 pages.
Written Opinion for PCT/US2011/020850, Mail Date Mar. 5, 2011, 7 pages.
International Search Report for PCT/US2011/020846, Mail Date Mar. 5, 2011, 4 pages.
International Search Report for PCT/US2011/020839, Mail Date Mar. 5, 2011, 5 pages.
International Search Report for PCT/US2011/020850, Mail Date Mar. 5, 2011, 3 pages.
International Preliminary Report on Patentability for PCT/US2011/020846, Mail Date May 27, 2011, 10 pages.
International Preliminary Report on Patentability for PCT/US2011/020839, Mail Date Apr. 30, 2013, 8 pages.
International Preliminary Report on Patentability for PCT/US2011/020850, Mail Date Jul. 17, 2012, 8 pages.
Purell GB7250 HDPE; https://polymers.lyondellbasell.com/portal/binary/com.vignette.vps.basell.productgrade. ProductGradeFileDisplay?id=e4e5a91b51980110VgnVCM100000646f3c14RCRD&type=iso;, Dated Apr. 2012.
Lupolen 1812 E LDPE; http://www.matweb.com/search/datasheet.aspx? matguid=9ae232a113dc459a88faf7606b7c4ade;, Dated Apr. 2012.

* cited by examiner

HIGH MELT STRENGTH POLYETHYLENE COMPOSITIONS AND METHODS FOR MAKING THE SAME

CROSS-REFERENCE TO RELATED APPLICATIONS

This application claims priority from U.S. patent application Ser. No. 12/685,148, filed Jan. 11, 2010, the disclosure of which is incorporated herein by reference for purposes of U.S. practice.

BACKGROUND AND SUMMARY OF THE INVENTION

Polyethylene resins are used in many applications requiring good physical properties, easy processing, sufficient melt strength for formation of films or blow molded articles. Linear Low Density Polyethylene (LLDPE) has very desirable physical properties but mostly lack sufficient melt strength to be used in certain film applications such as large bubble films or in blow molding applications, pipe applications and extrusion coating applications. Similarly High Density Polyethylene (HDPE) suffers from the same shortcoming as LLDPE with respect to melt strength. Low Density Polyethylene (LDPE) made by the high pressure free radical process while having significantly higher melt strength suffers from lack of good mechanical properties. In many applications a blend of LLDPE or HDPE with LDPE is used. Although those blends do have higher melt strength, the addition of even small amounts of LDPE, such as 10 to 20% LDPE, does cause a significant drop in the mechanical properties such as tear and dart impact resistance. Even in the case of LDPE there are areas a higher melt strength could be very beneficial such as extrusion coating or collation shrink.

There is a great need to be able to impart a required melt strength increase in an economical and controlled manner, with small cost increase. Such an improvement will enhance the use of polyethylene resins across the applications.

Polyethylene has desirable properties that have helped to make it the highest volume polymer manufactured. Polyethylene can be made in different processes in order to give different properties. Known families of polyethylene include high density polyethylene (HDPE), linear low density polyethylene (LLDPE), and low density polyethylene made using high pressure reactors (LDPE). Within these broad classes many variations exist resulting from different types of polyolefin process technologies (for example, solution, slurry or gas phase) or from the use of different catalysts (for example, Ziegler-Natta or constrained geometry catalysts). The desired application requires a careful balance of rheological properties which will lead a person of skill in the art to select one type of polyethylene over another. In many applications, such as blow-molding and blown film applications, melt strength of the polyethylene is a key parameter.

The melt strength is a practical measurement that can predict material performance in elongation. In melt processing, good melt strength is important to maintain stability during processes such as coating, blown film production, fiber spinning and foamed parts. Melt strength is related to several processing parameters such as bubble stability and therefore thickness variation during blown film production; parison formation during blow molding; sagging during profile extrusion; cell formation during foaming; more stable thickness distribution during sheet/film thermoforming.

This property can be enhanced by using resins with higher molecular weight, but such resins will generally require more robust equipment and more energy use because they tend to generate higher extrusion pressure during the extrusion process. Therefore, properties must be balanced to provide an acceptable combination of physical properties and processability.

In thick film applications, blends of LDPE and LLDPE are used in order to obtain a balance of processability (extruder amps and pressure) and film mechanical properties. In this blend the LDPE component is the processability component whereas the LLDPE is the mechanical component. Therefore, the ability to decrease the LDPE portion of the blend should increase the mechanical properties of the blend. Through this invention, the ability to increase the melt strength of the LLDPE component allows the use of a higher percentage of LLDPE in the blend, thus increasing the mechanical properties without sacrificing processability or the creation of unacceptable levels of insoluble material.

The present invention is a new method for increasing the melt strength of polyethylene involving reacting molten polyethylene with specified free radical generator with a specific peak decomposition temperature and decomposition energy through regular extrusion processing. Accordingly, one aspect of the invention is a method for increasing the melt strength of a polyethylene resin comprising first selecting a polyethylene resin having a density, as determined according to ASTM D792, in the range of from 0.90 g/cm$^3$ to 0.970 g/cm$^3$, and a melt index, as determined according to ASTM D1238 (2.16 kg, 190° C.), in the range of from 0.01 g/10 min to 30 g/10 min and then reacting the specified free radical generator with the polyethylene resin in an amount and under conditions sufficient to increase the melt strength of the polyethylene resin.

The present invention is a new process for increasing the melt strength of polyethylene involving reacting molten polyethylene with the specified free radical generator through regular extrusion processing. Accordingly, one aspect of the invention is a method for increasing the melt strength of a polyethylene resin comprising first selecting a polyethylene resin having a density, as determined according to ASTM D792, in the range of from 0.900 g/cm$^3$ to 0.970 g/cm$^3$, and a melt index, as determined according to ASTM D1238 (2.16 kg, 190° C.), in the range of from 0.01 g/10 min to 30 g/10 min and then reacting the specified free radical generator with the polyethylene resin in an amount and under conditions sufficient to increase the melt strength of the polyethylene resin.

The present invention is a new process that increases the melt strength of the resin.

The present invention is a new process that increases the Viscosity Ratio of the resin, indicating good processability.

DETAILED DESCRIPTION OF THE INVENTION

In its broadest sense, the present invention is a method for increasing the melt strength of a polyethylene resin. Polyethylene resin includes all polymers or polymer blends which are derived at least 50% by weight from ethylene monomer units. This includes materials known in the art as high density polyethylene (HDPE), linear low density polyethylene (LLDPE), and low density polyethylene made using high pressure reactors (LDPE).

The polyethylene resin selected should have a density, as determined according to ASTM D792, in the range of from 0.900 g/cm³ to 0.970 g/cm³, more preferably from 0.90 g/cm³ to 0.960 g/cm³ and a melt index, as determined according to ASTM D1238 (2.16 kg, 190° C.), in the range of from 0.01 g/10 min to 30 g/10 min, more preferably 0.1 g/10 min to 15 g/10 min. Suitable polyethylene resins can be produced with conventional Ziegler Natta or Chromium catalysts but also with metallocene or single site catalysts. Such resins may have monomodal or multimodal molecular weight distributions.

Once the polyethylene resin is selected, it is reacted with a specified free radical generator. A free radical generator must be selected in such a way that is has a certain exothermic decomposition energy and peak decomposition temperature combination to cause the required improvement in melt strength. If the decomposition energy is too high, then due to indiscriminate reaction of radicals the quality of polyethylene is reduced due to localized gel formation and renders the system unsuitable. On the other hand, if the bond energy is too low then no improvement in the melt strength is observed as the radicals are not energetic enough to react with polyethylene to cause molecular changes that are the source of the melt strength improvement. The inventive free radical generators must have a decomposition energy of at least –50 kJoules/mol and at most a decomposition energy of –250 kJoules per mole. In addition such free radical generators must have a peak decomposition temperature of less than 280 degree C. and more preferably less than 250 degree C.

A good inventive example of the present invention, but not limited to, are alkoxy amine derivatives. The alkoxy amine derivative is added in an amount and under conditions sufficient to increase the melt strength of the polyethylene resin. The alkoxy amine derivatives correspond to the formula:

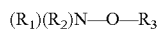

where $R_1$ and $R_2$ are each independently of one another, hydrogen, $C_4$-$C_{42}$ alkyl or $C_4$-$C_{42}$ aryl or substituted hydrocarbon groups comprising O and/or N, and where $R_1$ and $R_2$ may form a ring structure together; and where $R_3$ is hydrogen, a hydrocarbon or a substituted hydrocarbon group comprising O and/or N. Preferred groups for $R_3$ include —$C_1$-$C_{19}$alkyl; —$C_6$-$C_{10}$aryl; —$C_2$-$C_{19}$alkenyl; —O—$C_1$-$C_{19}$alkyl; —O—$C_6$-$C_{10}$aryl; —NH—$C_1$-$C_{19}$alkyl; —NH—$C_6$-$C_{10}$aryl; —N—($C_1$-$C_{19}$alkyl)$_2$. $R_3$ most preferably contains an acyl group.

The preferred compound may form nitroxylradical (R1)(R2)N—O* or amynilradical (R1)(R2)N* after decomposition or thermolysis.

A particularly preferred species of alkoxy amine derivative is 9-(acetyloxy)-3,8,10-triethyl-7,8,10-trimethyl-1,5-dioxa-9-azaspiro[5.5]undec-3-yl]methyl octadecanoate which has the following chemical structure:

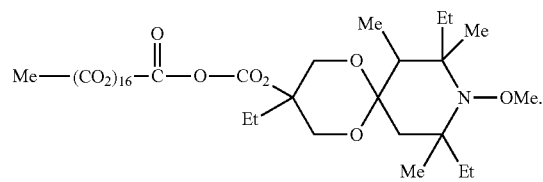

Examples of some preferred species for use in the present invention include the following:

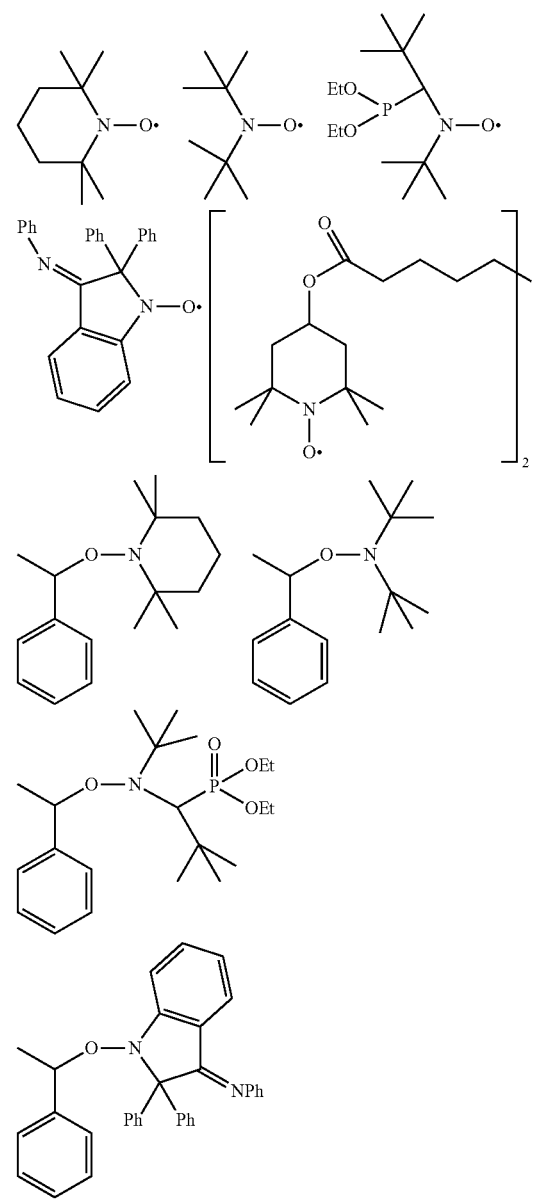

In general hydroxyl amine esters are more preferred with one particularly favored hydroxyl amine ester being 9-(acetyloxy)-3,8,10-triethyl-7,8,10-trimethyl-1,5-dioxa-9-azaspiro[5.5]undec-3-yl]methyl octadecanoate.

The alkoxy amine derivatives are added in an amount sufficient to increase the melt strength and/or increase the elongational viscosity to the desired level. In general the alkoxy amine derivatives are added in an amount of from 1 to 1,000 ppm of the polyethylene polymer by weight, more preferably from 30 to 200 ppm.

The addition to the polyethylene polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing. Particularly preferred processing machines are single-screw extruders, contra rotating and co rotating twin-screw extruders, planetarygear extruders, ring extruders or cokneaders. It is also possible to use processing machines provided with at least one gas removal compartment to which a vacuum can be applied. Suitable extruders and kneaders are described, for example, in Handbuch der Kunststoftextrusion, Vol 1 Grundlagen, Editors F. Hensen, W. Knappe, H. Potente, 1989, pp. 3-7, ISBN.3-446-14339-4 (Vol 2 Extrusionsanlagen 1986, ISBN 3-446-14329-7). For example, the screw length can be 1-60 times the screw diameter, preferably 35-48 times the screw diameters. The rotational speed of the screw is preferably 10-600 rotations per minute (rpm), more preferably 25-300 rpm. In the case of alkoxy amines, it is also possible to first prepare a concentrated mixture of the additive in a polyethylene resin, preferably at 1,000 to 10,000 ppm, and then introduce this concentrate via an extruder into a melted polyethylene using a static mixer to blend the two materials, preferably at 1 to 20 wt % of the concentrate in the melted resin. For the alkoxy amines the concentrate could be processed in an extruder, preferably at temperatures from 180 to 220° C. The temperatures in the static mixer could range from 200 to 250° C., with a residence time in the mixer ranging from 1 to 10 minutes.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The polymers need to be subjected to an elevated temperature for a sufficient period of time, so that the desired changes occur depending on the peak decomposition of the specific free radical generator. The temperature is generally above the softening point of the polymers. In a preferred embodiment of the proms of the present invention using alkoxy amines, a temperature range lower than 280° C., particularly from about 160° C. to 280° C. is employed. In a particularly preferred process variant, the temperature range from about 200° C. to 270° C. is employed.

The period of time necessary for reaction can vary as a function of the temperature, the amount of material to be reacted and the type of, for example, extruder used. It is usually from about 10 seconds to 20 minutes, in particular from 20 seconds to 30 minutes.

The specific free radical generator can advantageously be added to the mixing device by use of a masterbatch. As will be appreciated by those of ordinary skill in the art, the carrier resin for the masterbatch should be chosen to be compatible with the resin to be modified. LDPE high pressure low density polyethylene polymers (referred to in the industry as "LDPE") were unexpectedly found to be the preferred carrier due to the lower reactivity as evidenced by little variation of the extrusion pressure during masterbatch production. HDPE may be a better carrier as it will react even less because it does not have tertiary carbons. Another advantage of this invention is the discovery that polypropylene is not a good carrier for this additive, as it tends to degrade at typical processing temperatures. Another discovery is that the carrier resin should be substantially free of any antioxidant additives, preferably having less than 1,000 ppm of antioxidant additives, as they tend to suppress the activity of the additive.

The preferred carrier resin should be compatible with the application at hand; it should have similar viscosity with the polyethylene resin that it is going to be blended with. It should be preferably an LDPE or HDPE resin with vinyls below 0.07 per 1,000 carbons. The preferred carrier resin should have a molecular weight (Mn) that is less than 50,000 g/mol so that it is easy to process, as demonstrated by the pressure drop through the extruder. The carrier resin could incorporate other additives for processing aids but it should be substantially free of antioxidant compounds, preferably containing less than 1,000 ppm of any antioxidant compound.

The polyethylene resin could be a copolymer of ethylene with any alkene monomer containing 3 to 12 carbons. Preferably, the polyethylene resin should have a level of vinyls ranging from 0.2 to 0.45 vinyls per 1,000 carbons. It should have a molecular slightly slower than the carrier resin, as measured by the melt index (g/10 min). Preferably, the melt index of the polyethylene resin should be higher by 20 to 30% higher than the final desired resin. Preferably, the polyethylene resin should contain minimal or no antioxidant additives, and any additives should be well-dispersed in the resin prior to being blended with the carrier resin.

The amount of the active material in the carrier resin should be in the range of 1 to 30%, preferably in the range of 0.2 to 0.5%. The amount of the active ingredient in the final product should be sufficient to achieve the desired improvement in the melt strength. In the case of alkoxyamine specified it should be in the range of 10 to 400 ppm, preferably in the range of 30 to 300 ppm. The polyethylene resin should contain less than 2,000 ppm of antioxidant compounds.

The amount of specified free radical generator used for improving melt strength will depend on the specific melt index antioxidant levels but should be so selected as to not leave too much unreacted free radical generator as to cause further changes in melt strength than was originally desired in the final finished article. Under this invention, one way to avoid further changes of the final product is to blend this resin with another resin that is rich in antioxidants.

As part of this invention, the polyethylene resin could be an LDPE resin with vinyl content greater than 0.4 vinyls per 1,000 carbons and containing no primary antioxidants.

Testing Methods

Melt Strength

Melt strength measurements were conducted on a Gottfert Rheotens 71.97 (Göettfert Inc.; Rock Hill, S.C.), attached to a Gottfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips located 100 mm below the die, with an acceleration of 2.4 mm/s$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

Melt Index

Melt index, or I2, is measured in accordance with ASTM D 1238-10, Condition 190° C./2.16 kg, and is reported in grams eluted per 10 minutes. The I10 was measured in accordance with ASTM D 1238, Condition 190° C./10 kg, and was reported in grams.

Density

Samples for density measurements were prepared according to ASTM D 4703-10. Samples were pressed at 374° F. (190° C.) for five minutes at 10,000 psi (68 MPa). The temperature was maintained at 374° F. (190° C.) for the above five minutes, and then the pressure was increased to 30,000 psi (207 MPa) for three minutes. This was followed by one minute hold at 70° F. (21° C.) and 30,000 psi (207 MPa). Measurements are made within one hour of sample pressing using ASTM D792-08, Method B.

Dynamic Mechanical Spectroscopy

Resins were compression-molded into "3 mm thick×1 inch" circular plaques at 350° F. for five minutes, under 1500 psi pressure in air. The sample was then taken out of the press, and placed on the counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate is removed), and then the test was started. The method had an additional five minute delay built in, to allow for temperature equilibrium. The experiments were performed at 190° C. over a frequency range of 0.1 to 100 rad/s. The strain amplitude was constant at 10%. The stress response was analyzed in terms of amplitude and phase, from which the storage modulus (G'), loss modulus (G"), complex modulus (G*), complex viscosity $\eta^*$, tan ($\delta$) or tan delta, viscosity at 0.1 rad/s (V0.1), the viscosity at 100 rad/s (V100), and the Viscosity Ratio (V0.1N100) were calculated.

Differential Scanning Calorimetry (DSC)

Differential Scanning calorimetry (DSC) can be used to measure the thermal stability of a material over a wide range of temperatures. For example, the TA Instruments Q200 DSC, equipped with an RCS (refrigerated cooling system) is used to perform this analysis. A 0.5-2 mg sample is placed in a glass capillary tube, weighed, and flame sealed with a specified headspace gas while being kept cool using a "cold finger" device. Analysis is then performed to determine its thermal properties. For the analysis of the peak decomposition temperature of free radical initiators and their energy of decomposition, the sample size used is generally on the order of 10 to 20 mg.

The thermal behavior of the sample is determined by ramping the sample temperature up and down to create a heat flow versus temperature profile. First, the sample is rapidly taken to the desired initial temperature, then heated at 10° C./min to the desired end temperature. Next, the sample is cooled. The sample is then heated again (this is the "reheat" ramp) at a 10° C./minute heating rate (the reheating part is not done for free radical generator studies only for polyethylene resin studies. Both heating curves are recorded. The initial heat curve is analyzed by setting baseline endpoints from the beginning to the end of thermal activity, or the case of incomplete endotherms/exotherms end of the test. The reheat is used to assist in the determination of integration start and end. The values determined are peak temperature ($T_m$), peak thermal activity temperature, energy (in Joules per gram).

For the free radical generators the peak temperature is recorded as well as the total decomposition energy by integration of the area between the curve of the first heat cycle and the baseline. As will be readily understood by one of skill in the art, if the decomposition is exothermic, then the area between the curve and the baseline is integrated as negative due to the fact that there is negative heat flow. That is, the sample generates heat. If the sample is endothermic such that it takes heat, then the area is integrated as a positive number. In this case the curve is above the baseline.

Triple Detector Gel Permeation Chromatography (TDGPC)—Conventional GPC. Light Scattering GPC, and gpcBR For the GPC techniques used herein (Conventional GPC, Light Scattering GPC, and gpcBR), a Triple Detector Gel Permeation Chromatography (3D-GPC or TDGPC) system was used. This system consists of a Waters (Milford, Mass.) model 150 C High Temperature Chromatograph (other suitable high temperatures GPC instruments include Polymer Laboratories (Shropshire, UK) Model 210 and Model 220), equipped with a Precision Detectors (Amherst, Mass.) 2-angle laser light scattering (LS) detector Model 2040, an IR4 infra-red detector from Polymer ChAR (Valencia, Spain), and a Viscotek (Houston, Tex.) 150R 4-capillary solution viscometer (DP).

A GPC with these latter two independent detectors and at least one of the former detectors is sometimes referred to as "3D-GPC" or "TDGPC," while the term "GPC" alone generally refers to conventional GPC. Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

The eluent from the GPC column set flows through each detector arranged in series, in the following order: LS detector, IR4 detector, then DP detector. The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below in the paragraph following Equation (5).

Suitable high temperature GPC columns can be used, such as four 30 cm long Shodex HT803 13 micron columns, or four 30 cm Polymer Labs columns of 20-micron mixed-pore-size packing (MixA LS, Polymer Labs). Here, the MixA LS columns were used. The sample carousel compartment is operated at 140° C., and the column compartment is operated at 150° C. The samples are prepared at a concentration of "0.1 grams of polymer in 50 milliliters of solvent." The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are gently stirred at 160° C. for four hours. The injection volume is 200 microliters. The flow rate through the GPC is set at 1 ml/minute.

Conventional GPC

For Conventional GPC, the IR4 detector is used, and the GPC column set is calibrated by running 21 narrow molecular weight distribution polystyrene standards. The molecular weight (MW) of the standards ranges from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to or greater than 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing highest molecular weight component to minimize degradation. The polystyrene standard peak molecular weights are converted to polyethylene molecular weight using Equation (1) (as described in Williams and Ward, J. Polym. Sci., Polym. Letters, 6, 621 (1968)):

$$M\text{polyethylene} = A \times (M\text{polystyrene})^B \quad \text{(Eq. 1)},$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as outlined in the section on Light Scattering (LS) GPC below in the paragraph following Equation (5). Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{CC} = \sum_i \left( \frac{C_i}{\sum_i C_i} \right) M_i = \sum_i w_i M_{cc,i} \quad \text{(Eq. 2)}$$

$$M_{n,cc} = \Sigma w_i / \Sigma (w_i / M_{cc,i}) \quad \text{(Eq. 3)}$$

$$M_{z,cc} = \Sigma (w_i M_{cc,i}^2) / \Sigma (w_i M_{cc,i}) \quad \text{(Eq. 4)}$$

Light Scattering (LS) GPC

For the LS GPC, the Precision Detector PDI2040 detector Model 2040 is used. Depending on the sample, either the 15° angle or the 90° angle of the light scattering detector is used for calculation purposes. Here, the 15° angle was used.

The molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used in the determination of the molecular weight is obtained from the mass detector area, and the mass detector constant derived from a suitable linear polyethylene homopolymer, or one of the polyethylene standards of known weight average molecular weight. The calculated molecular weights are obtained using a light scattering constant derived from one or more of the polyethylene standards mentioned below and a refractive index concentration coefficient, dn/dc, of 0.104. Generally, the mass detector response and the light scattering constant should be determined from a linear standard with a molecular weight in excess of about 50,000 g/mole. The viscometer calibration can be accomplished using the methods described by the manufacturer, or, alternatively, by using the published values of suitable linear standards such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight average molecular weight ("Mw, Abs") is determined using Equation (5) below, using the "peak area" method for higher accuracy and precision. The "LS Area" and the "Conc. Area" are generated by the chromatograph/detectors combination.

$$Mw = \sum_i w_i M_i \quad \text{(Eq. 5)}$$

$$= \sum_i \left( \frac{C_i}{\sum_i C_i} \right) M_i$$

$$= \frac{\sum_i C_i M_i}{\sum_i C_i}$$

$$= \frac{\sum_i LS_i}{\sum_i C_i}$$

$$= \frac{LS \text{ Area}}{\text{Conc. Area}}$$

For each LS profile, the x-axis (log MWcc-CPC), where cc refers to the conventional calibration curve, is determined as follows. First, the polystyrene standards (see above) are used to calibrate the retention volume into "log $MW_{PS}$." Then, Equation 1 (Mpolyethylene=A×(Mpolystyrene)$^B$) is used to convert "log $MW_{PS}$." to "log $MW_{PE}$." The "log $MW_{PE}$" scale serves as the x-axis for the LS profiles of the experimental section (log $MW_{PE}$ is equated to the log MW(cc-CPC)). The y-axis for each LS profile is the LS detector response normalized by the injected sample mass. Initially, the molecular weight and intrinsic viscosity for a linear polyethylene standard sample, such as SRM 1475a or an equivalent, are determined using the conventional calibrations ("cc") for both molecular weight and intrinsic viscosity as a function of elution volume.

In the low molecular weight region of the GPC elution curve, when the presence of a significant peak that is known to be caused by the presence of anti-oxidant or other additives, the presence of such peak will cause an underestimation of the number average molecular weight (Mn) of the polymer sample to give a overestimation of the sample polydispersity defined as Mw/Mn, where Mw is the weight average molecular weight. The true polymer sample molecular weight distribution can therefore be calculated from the GPC elution by excluding this extra peak. This process is commonly described as the peak skim feature in data processing procedures in liquid chromatographic analyses. In this process, this additive peak is skimmed off from the GPC elution curve before the sample molecular weight calculation is performed from the GPC elution curve.

gpcBR Branching Index by Triple Detector GPC (3D-GPC)

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants. Upon obtaining the constants, the two values are used to construct two linear reference conventional calibrations for polyethylene molecular weight and polyethylene intrinsic viscosity as a function of elution volume, as shown in Equations (6) and (7):

$$M_{PE} = \left( \frac{K_{PS}}{K_{PE}} \right)^{1/\alpha_{PE}+1} \cdot M_{PS}^{\alpha_{PS}+1/\alpha_{PE}+1}, \quad \text{(Eq. 6)}$$

$$[\eta]_{PE} = K_{PS} \cdot M_{PS}^{\alpha+1} / M_{PE} \quad \text{(Eq. 7)}.$$

The gpcBR branching index is a robust method for the characterization of long chain branching as described in Yau, Wallace W., "Examples of Using 3D-GPC-TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equations (8). The area calculation in Equation (5) and (8) offers more precision, because, as an overall sample area, it is much less sensitive to variation caused by detector noise and 3D-GPC settings on baseline and integration limits. More importantly, the peak area calculation is not affected by the detector volume offsets. Similarly, the high-precision sample intrinsic viscosity (IV) is obtained by the area method shown in Equation (8):

$$IV = [\eta] \quad \text{(Eq. 8)}$$

$$= \sum_i w_i IV_i$$

$$= \sum_i \left( \frac{C_i}{\sum_i C_i} \right) IV_i$$

$$= \frac{\sum_i C_i IV_i}{\sum_i C_i}$$

$$= \frac{\sum_i DP_i}{\sum_i C_i}$$

$$= \frac{DP \text{ Area}}{Conc. \text{ Area}},$$

where DPi stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume, per Equations (2) and (9):

$$[\eta]_{CC} = \sum_i \left( \frac{C_i}{\sum_i C_i} \right) IV_i = \sum_i w_i IV_{cc,i}. \quad \text{(Eq. 9)}$$

Equation (10) is used to determine the gpcBR branching index:

$$gpcBR = \left[ \left( \frac{[\eta]_{CC}}{[\eta]} \right) \cdot \left( \frac{M_W}{M_{W,CC}} \right)^{\alpha_{PE}} - 1 \right], \quad \text{(Eq. 10)}$$

wherein $[\eta]$ is the measured intrinsic viscosity, $[\eta]_{cc}$ is the intrinsic viscosity from the conventional calibration, Mw is the measured weight average molecular weight, and $M_{w,cc}$ is the weight average molecular weight of the conventional calibration. The weight average molecular weight by light scattering (LS) using Equation (5) is commonly referred to as "absolute weight average molecular weight" or "$M_w$, Abs." The $M_{w,cc}$ from from Equation (2) using conventional GPC molecular weight calibration curve ("conventional calibration") is often referred to as "polymer chain backbone molecular weight," "conventional weight average molecular weight," and "$M_{w,GPC}$."

All statistical values with the "cc" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for α and Log K for the determination of gpcBR in this particular case are 0.725 and −3.355, respectively, for polyethylene, and 0.722 and −3.993, respectively, for polystyrene.

Once the K and α values have been determined using the procedure discussed previously, the procedure is repeated using the branched samples. The branched samples are analyzed using the final Mark-Houwink constants as the best "cc" calibration values, and Equations (2)-(9) are applied.

The interpretation of gpcBR is straight forward. For linear polymers, gpcBR calculated from Equation (8) will be close to zero, since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination.

EXPERIMENTAL

Free Radical Generators

For the purpose of this invention three free radical generators were used.

A low decomposition energy free radical generator 3,4-diethyl-3,4-diphenyl hexane (hereafter will be referred to as free radical generator 1), an intermediate decomposition energy free radical energy generator an alkoxy amine derivative: 9-(acetyloxy)-3,8,10-triethyl-7,8,10-trimethyl-1,5-dioxa-9-azaspiro[5.5]undec-3-yl]methyl octadecanoate which has the following chemical structure (hereafter will be referred to as free radical generator 2):

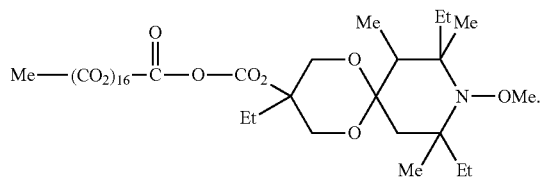

The third free radical generator used was a well known peroxide with very high decomposition energy that is used mostly for cross linking of the polyethylene as its high reactivity renders it not useful for the purpose of increasing the melt strength of the polyethylene resins with good quality product. This peroxide free radical generator is commercially available from Akzo Chemical under the trade name Trigonox 101 (hereafter referred to as free radical generator 3).
The peak decomposition temperatures and the decomposition energies of the free radical generators are given in Table 1. Note that the decomposition energy in kJ/mol is calculated as the decomposition energy in kJ/g multiplied by the molecular weight in g/mol multiplied by the percent purity divided by 100.

TABLE 1

Decomposition temperatures and energies of free radical generators

| Compound | Type | MW (g/mol) | Purity % | Peak Temp. (° C.) | Start Temp. (° C.) | Finish Temp. (° C.) | Decomp. Energy (J/g) | Decomp. Energy kJ/Mol |
|---|---|---|---|---|---|---|---|---|
| Free Radical Generator 1 | Comparative Example | 270 | 98 | 204 | 146 | 227 | 32 | 8.5 |
| Free Radical Generator 2 | Inventive Example | 638 | 99 | 248 | 199 | 321 | −230 | −145.8 |
| Free Radical Generator 3 | Comparative Example | 290 | 94 | 188 | 114 | 218 | −1124 | −306.95 |

The linear low density polyethylene, LLDPE, used was produced by Ziegler Natta catalysis and was a 1 melt index (I2 or MI), 0.926 g/cm³ density, with additives of 1,000 ppm Irgafos 168 (Ciba Specialty Chemicals, Inc., Basel, Switzerland).

Examples were produced from this LLDPE extruded with different concentrations of the free radical generators. The specified free radical generators (except for the Trigonox 101 as this is well known to those skilled in the art as a cross linking agent incapable of producing higher melt strength without significant gel generation), were added as an LDPE masterbatch having 5,600 parts by weight of free radical generator 2 per million parts by weight LDPE or an equivalent molar amount of free radical generator 1 (note that the ppm levels reported below refer to the active ingredient only and not the entire masterbatch).

LLDPE and the specified free radical generators were compounded in a 30 mm co-rotating, intermeshing Coperion Werner-Pfleiderer ZSK-30 (ZSK-30) twin screw extruder. The ZSK-30 has ten barrel sections with an overall length of 960 mm and a 32 length to diameter ratio (L/D). A two hole strand die was used without a breaker plate or screen pack. The extruder consists of a DC motor, connected to a gear box by V-belts. The 15 HP motor is powered by a GE adjustable speed drive located in a control cabinet. The control range of the screw shaft speed is 1:10. The maximum screw shaft speed is 500 RPM. A pressure transducer was positioned in front of the die to measure die pressure.

The extruder has 8 heated/cooled barrel sections along with a 30 mm spacer, which makes up five temperature controlled zones. It has a cooled only feed section and a heated only die section, which is held together by tie-rods and supported on the machine frame. Each section can be heated electrically with angular half-shell heaters and cooled by a special system of cooling channels.

The screws consist of continuous shafts on which screw-flighted components and special kneading elements are installed in any required order. The elements are held together radially by keys and keyways and axially by a screwed-in screw tip. The screw shafts are connected to the gear-shafts by couplings and can easily be pulled out of the screw barrel for dismantling.

A Conair pelletizer was used to pelletize the blends. It is a 220 volt variable speed, solid cutter unit. The variable speed motor drives a solid machined cutting wheel, which in turn drives a fixed metal roller. A movable rubber roller presses against the fixed roller and helps pull the strands by friction into the cutting wheel. The tension on the movable roller may be adjusted as necessary.

The temperatures were set in the feed zone, 4 zones in the extruder, and the die as:

| Feed: | 80° C. |
|---|---|
| Zone 1: | 160° C. |
| Zone 2: | 180° C. |
| Zone 3: | 185° C. |
| Zone 4: | 190° C. |
| Die: | 230° C. |

The screw shaft speed was set at 325 revolutions per minute (RPM), resulting in an output rate of approximately 40 lb/hr.
LLDPE was extruded with 19 ppm and 38 ppm of the free radical generator 1, with 60 ppm and 120 ppm free radical generator 2, and the LLDPE was also extruded alone with characterization results shown in Table 2.

TABLE 2

Melt Indexes, DMS Viscosity, Melt strength, and TDGPC data from conventional calibration (cc) and gpcBR of LLDPE, LLDPE Extruded, and LLDPE with 19 ppm and 38 ppm Free radical Generator 1 (1$^{st}$ pass).

|  | Comparative Example 1 LLDPE | Comparative Example 2 LLDPE Extruded (1st Pass) | Comparative Example 3 LLDPE Extruded with 19 ppm free radical generator 1 additive (1st Pass) | Comparative Example 4 LLDPE Extruded with 38 ppm free radical generator 1 additive (1st Pass) | Inventive Example 5 LLDPE Extruded with 60 ppm free radical generator 2 additive (1$^{st}$ pass) | Inventive Example 6 LLDPE Extruded with 120 ppm free radical generator 2 additive (1$^{st}$ pass) |
|---|---|---|---|---|---|---|
| $I_2$ (g/10 min) | 1.09 | 0.90 | 1.03 | 1.03 | 0.66 | 0.44 |
| $I_{10}$ (g/10 min) | 8.51 | 7.67 | 8.27 | 8.24 | 6.45 | 5.53 |
| $I_{10}/I_2$ | 7.83 | 8.53 | 8.03 | 8.00 | 9.76 | 12.50 |
| Visc. 0.1 rad/s (Pa-s) | 7,982 | 10,525 | 8,808 | 8,651 | 14,633 | 25,838 |
| Visc 1 rad/s (Pa-s) | 6,359 | 7,324 | 6,675 | 6,579 | 9,004 | 12,292 |
| Visc. 10 rad/s (Pa-s) | 3,906 | 4,093 | 3,941 | 3,896 | 4,539 | 4,993 |
| Visc. 100 rad/s (Pa-s) | 1,600 | 1,609 | 1,607 | 1,592 | 1,686 | 1,680 |
| Visc. Ratio | 4.99 | 6.54 | 5.48 | 5.44 | 8.68 | 15.38 |
| Tan Delta 0.1 rad/s | 9.09 | 4.98 | 7.02 | 7.22 | 3.39 | 2.01 |
| Melt Strength (cN) | 2.7 | 3.8 | 3.7 | 3.5 | 5.6 | 7.3 |
| cc-GPC Mn (g/mol) | 26,680 | 26,390 | 26030 | 25350 | 26,500 | 25,520 |
| cc-GPC Mw (g/mol) | 106,380 | 106,780 | 101090 | 101540 | 109,390 | 102,950 |
| cc-GPC Mz (g/mol) | 319,700 | 316,000 | 285400 | 284000 | 335,100 | 290,500 |
| cc-GPC Mw/Mn | 3.99 | 4.05 | 3.88 | 4.01 | 4.13 | 4.03 |
| gpcBR | 0.015 | 0.069 | 0.131 | 0.138 | 0.051 | 0.068 |

Visc. = Viscosity
Visc. Ratio = Viscosity Ratio

It is clear from Table 2 that the most significant improvement in melt strength, and viscosity ratios came from inventive examples with free radical generator 2 with moderate decomposition energy. Free radical generator 1 did not produce any effect on polyethylene in terms of change in melt strength or other parameters such as Viscosity Ratio. Comparative Example 2 is Comparative Example 1 with one pass extrusion. In this case, there is some increase in melt strength as Comparative Example 1 does not contain any primary antioxidant and only 1,000 ppm Irgafos 168 (a secondary antioxidant available from Ciba Specialty Chemicals).

What is claimed is:

1. A method for increasing the melt strength of a polyethylene resin comprising the steps of:
    a) selecting a first polyethylene resin selected from the group consisting of LLDPE, HDPE, LDPE and blends thereof, wherein said first polyethylene resin has a density, as determined according to ASTM D792, in the range of from 0.900 g/cm³ to 0.970 g/cm³, and a melt index, as determined according to ASTM D1238 (2.16 kg, 190° C.), in the range of from 0.01 g/10 min to 30 g/10 min, and wherein said first polyethylene resin has less than 2000 ppm antioxidant;
    b) reacting said first polyethylene resin with a free radical generator with a decomposition energy in the range of from −50 kJoules/mole to −250 kJoules/mole, with a peak decomposition temperature of no less than 150 degree C. and not more than 280 degree C., wherein the free radical generator is in a carrier resin selected from the group consisting of LDPE, HDPE and blends thereof, wherein the carrier resin comprises less than 1,000 ppm antioxidant and wherein the free radical generator is in an amount in the range of from 30 to 200 ppm and added under conditions sufficient to increase the melt strength of the polyethylene resin by at least 20% over and above a control not reacted with said free radical generators.

2. The method of claim 1 wherein free radical generator is an alkoxy amine derivative corresponds to the formula:

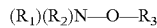

where $R_1$ and $R_2$ are each independently of one another, hydrogen, $C_4$-$C_{42}$ alkyl or $C_4$-$C_{42}$ aryl or substituted hydrocarbon groups comprising O and/or N, and where $R_1$ and $R_2$ may form a ring structure together; and $R_3$ is hydrogen, a hydrocarbon or a substituted hydrocarbon group comprising O and/or N.

3. The method of claim 1 wherein the alkoxy amine derivative is a hydroxylamine ester.

4. The method of claim 3 wherein the hydroxylamine ester is hydroxylamine ester being 9-(acetyloxy)-3,8,10-triethyl-7,8,10-trimethyl-1,5-dioxa-9-azaspiro[5.5]undec-3-yl]methyl octadecanoate.

5. A blend comprising:
    a) less than 100 percent by weight of a polyethylene polymer which has been formed by first selecting a first polyethylene resin selected from the group consisting of LLDPE, HDPE, LDPE and blends thereof, wherein said first polyethylene resin has a density, as determined according to ASTM D792, in the range of from 0.900 g/cm³ to 0.970 g/cm³, and a melt index, as determined according to ASTM D1238 (2.16 kg, 190° C.), in the range of from 0.01 g/10min to 30 g/10 min; and then reacting said first polyethylene resin with a free radical generator with a decomposition energy in the range of from -50 kJoules/mole to -250 kJoules/mole, with a peak decomposition temperature of no less than 150 degree C. and not more than 280 degree C., wherein the free radical generator is in a carrier resin selected from the group consisting of LDPE, HDPE and blends thereof, wherein the carrier resin comprises less than 1,000 ppm antioxidant and wherein the free radical generator is in an amount in the range of from 30 to 200 ppm and added under conditions sufficient to increase the melt strength of the polyethylene resin by at least 20% over and above a control not reacted with said free radical generators; wherein the unmodified first polyethylene resin is further characterized by having less than 1,000 ppm antioxidant and
    b) another polyethylene resin selected from the group consisting of LLDPE, HDPE, LDPE and blends thereof.

6. The blend of claim 5, wherein said modified first polyethylene has a density in the range of from 0.900 to 0.970 g/cm$^3$.

7. The blend of claim 5, wherein said modified first polyethylene has a melt index in the range of 0.01 to 30 g/10 minutes.

8. The blend of claim 5, wherein said modified first polyethylene has a molecular weight distribution, $M_w/M_n$, of less than about 5.

9. The blend of claim 5 formed into a film.

10. The blend of claim 5 formed into a molded article.

11. The blend of claim 5 formed into an extruded article.

12. The blend of claim 5, wherein the melt flow ratio of $I_{10}/I_2$ of the said modified first polyethylene is greater than 9.

13. The blend of claim 5, wherein [Viscosity at 0.1 rad/s]/[Viscosity at 100 rad/s] of the said modified first polyethylene measured at 190° C. is greater than 8.

14. The blend of claim 5, wherein tan delta at 0.1 rad/s of the said modified first polyethylene measured at 190° C. is less than 4.

15. The blend of claim 5, wherein melt strength of the said modified first polyethylene measured at 190° C. is greater than 5.

16. The blend of claim 5, wherein the gpcBR of the said modified first polyethylene is greater than 0.03.

* * * * *